US007376640B1

(12) United States Patent
Anderson et al.

(10) Patent No.: US 7,376,640 B1
(45) Date of Patent: May 20, 2008

(54) METHOD AND SYSTEM FOR SEARCHING AN INFORMATION RETRIEVAL SYSTEM ACCORDING TO USER-SPECIFIED LOCATION INFORMATION

(75) Inventors: David J. Anderson, Lawrenceville, GA (US); Senis Busayapongchai, Tucker, GA (US)

(73) Assignee: AT&T Delaware Intellectual Property, Inc.

( * ) Notice: Subject to any disclaimer, the term of this patent is extended or adjusted under 35 U.S.C. 154(b) by 6 days.

(21) Appl. No.: 09/710,955

(22) Filed: Nov. 14, 2000

(51) Int. Cl.
*G06F 17/30* (2006.01)
(52) U.S. Cl. ............... 707/3; 707/4; 707/5; 707/10; 701/201; 701/207; 701/208; 701/209; 701/211
(58) Field of Classification Search ............... 707/3, 707/4, 5, 10; 701/201, 207, 208, 209, 211, 701/213, 214
See application file for complete search history.

(56) References Cited

U.S. PATENT DOCUMENTS

| | | | | |
|---|---|---|---|---|
| 5,682,525 | A * | 10/1997 | Bouve et al. ............ | 707/104.1 |
| 5,878,423 | A | 3/1999 | Anderson et al. ............ | 707/100 |
| 6,167,274 | A * | 12/2000 | Smith ............ | 455/456 |
| 6,202,023 | B1 * | 3/2001 | Hancock et al. ............ | 701/201 |
| 6,317,718 | B1 * | 11/2001 | Fano ............ | 705/1 |
| 6,385,312 | B1 * | 5/2002 | Shaffer et al. ............ | 379/211.02 |
| 6,405,123 | B1 * | 6/2002 | Rennard et al. ............ | 701/200 |
| 6,564,143 | B1 * | 5/2003 | Alewine et al. ............ | 701/207 |
| 6,615,131 | B1 * | 9/2003 | Rennard et al. ............ | 701/200 |
| 2001/0051876 | A1 * | 12/2001 | Seigel et al. ............ | 705/1 |
| 2002/0045456 | A1 * | 4/2002 | Obradovich ............ | 455/457 |
| 2002/0049644 | A1 * | 4/2002 | Kargman ............ | 705/26 |
| 2002/0052674 | A1 * | 5/2002 | Chang et al. ............ | 700/300 |
| 2002/0147790 | A1 * | 10/2002 | Snow ............ | 709/217 |
| 2002/0171581 | A1 * | 11/2002 | Sheynblat et al. ............ | 342/357.09 |
| 2003/0060211 | A1 * | 3/2003 | Chern et al. ............ | 455/456 |

OTHER PUBLICATIONS

U.S. Census Bureau, "How People Use Economic Census Data", Jun. 14, 1996, 3 pages. Downloaded on Dec. 4, 2003 at http://www.census.gov/epcd/www/ec97uses.html.*
"Info by Voice by Atlanta," Atlanta Yellow Pages Insert, pp. 91-96.
www.mapquest.com, Feb. 27, 2002.
www.tellme.com, "the phone as it can be", Nov. 26, 2001.

(Continued)

*Primary Examiner*—Khanh B. Pham
(74) *Attorney, Agent, or Firm*—Merchant & Gould

(57) ABSTRACT

A method and system for searching an information retrieval system for items of interest that are in proximity to geographical locations provided by the user. The information retrieval system can perform a search for specified types of businesses or items of interest that surround or are in close proximity to the user's present geographical location, or a geographical location that the user has pre-configured in a database. The system receives geographical location information concerning the user's position from the wireless network carrier, which tracks the location of the user's mobile communications device. When the user desires to store a geographical location and geographical name for a future search, the information is entered into the pre-configured database. When conducting an information search at a later time, the user can narrow a search request to a geographical area in the vicinity of the stored geographical location.

11 Claims, 10 Drawing Sheets

OTHER PUBLICATIONS www.audiopoint.com, "Where can we take You?", Nov. 26, 2001.
www.bevocal.com, "Telecom Solutions", Dec. 11, 2001.
www.signalsoft.com, "About SignalSoft", Dec. 11, 2001.
Hamilton, Anita, "Speak Up, Will Ya?", *Time Magazine,* Aug. 7, 2000.
Bly, Laura, "Travelers Use Phones to Access the Internet," *The Times-Picayune New Orleans,* Jan. 21, 2001.
"Implementing the Portal Involves Company Partnerships," Speech Technology, Sep./Oct. 2000.
Miller, Daniel N., "The Rec'ing Crew at BellSouth IntelliVentures," Dec. 5, 1997.
Miller, Daniel N., "The Kelsey Report," Jul. 1996, pp. 1-5.
Nee, Eric, "Who Wants to Talk to the Web," Fortune, Nov. 12, 2000.
The Standard Intelligence for the Internet Economy, avaliable at http://www.thestandard.com/article/display/0,1151,18154,00,html?nrc=nhsr.
Kanell, Michael E., "BellSouth's Free Phone Service Mimics Net," The Atlantic Journal Constitution, Jan. 19, 2000.

\* cited by examiner

Figure 3

| Type of Business | Name | Address | Phone | Hours | Prices | Features | Geographical Coordinates | Location |
|---|---|---|---|---|---|---|---|---|
| Restaurant/Bar Dance Club/Banquet Facility/Caterer/Event Site | Joe's American Food | 1121 Main St. | (404) 371-1234 | 9am-midnight 7 days/week | $8 - $17 Entrees | Dancing/ Reservations Required/No Smoking Section/American Food | 213.057°/392.112° | Near Buckhead Mall |
| Restaurant | Lee's Chinese Food | 15 Jefferson St. | (404) 369-4321 | 11:30am-8pm | $7.50-$11.50 | Chinese Food | 214.119°/391.110° | Near Downtown |
| Restaurant | Baghdadi Café | 20 Sun Blvd. | (404) 775-1321 | 2pm-4pm | $2.50 - $5.50 | Egyptian Cuisine | 215.220°/390.113° | Near Downtown |
| Gasoline Station | Amocon | 18 Jefferson St. | (404) 777-5555 | 6am-12am | $1.69 $1.75 $1.88 | Mini Market/Full Service Diesel | 216.221°/389.262° | Near Downtown |
| Department Store | Woodman's | 3 N St | (404) 663-8261 | 10am-9pm | - | Clothing/Fashion Accessories Shoes | 217.222°/388.260° | Near Lincoln Mall |
| Gasoline Station | Exxoni | 751 P St | (404) 799-9350 | 5am-1am | $1.55 $1.60 $1.65 | - | 218.698°/341.120° | Wooton |
| Pharmacy | CVSO | 950 F. St. | (404) 321-1239 | 10am-10pm | - | Drive thru Window/Rapid Refill | 219.219°/330.111° | Near Lincoln Mall |
| Restaurant/Bar | Sam's Bar | 1 Pent St | (404) 333-1649 | 5pm-1am | - | Home Brewed Beer | 220.236°/986.210° | Near MLK Highway |
| Pharmacy | Write-Aid | 5 Shaw Ave | (404) 392-6333 | 9am-9pm | - | - | 221.602°/561.877° | Near Downtown |
| Food Market | Don's Meats | 10 Penn Rd. | (404) 393-6349 | 10am-6pm | - | Carryout Cooked, Uncooked | 222.801°/322.901° | Near Buckhead Mall |

Figure 4

| Account Code | Encoded Locating Name | Encoded Location | Cell Site |
|---|---|---|---|
| 301-555-9274 | Johnnie's School | 367.1587°/125.540° | 59 |
| | Office | 368.0052°/125.120° | 43 |
| | Gym | 367.1123°/125.125° | 57 |
| | Golf Course | 369.1121°/125.1235° | 69 |
| | Debbie's Work | 367.1440°/124.111° | 59 |
| | Movies | 365.1129°/125.8972° | 52 |
| | Town Space | 364.1290°/127.9888° | 56 |
| 301-907-245 | Office | 350.1925°/200.222° | 98 |
| | College | 362.1110°/201.350° | 92 |
| | Larry's Office | 360.1120°/200.099° | 89 |
| | Bagdadi Cafe | 359.0920°/206.0119° | 95 |
| | The Theatre | 360.1120°/200.099° | 101 |
| 301-276-9872 | Office | 327.66°/197.987° | 22 |
| | Hangout | 327.79°/198.092° | 27 |
| | The Monument | 327.79°/198.092° | 25 |
| | Georgetown | 326.99°/197.095° | 29 |
| | Olney | 325.62°/198.520° | 35 |

METHOD AND SYSTEM FOR SEARCHING AN INFORMATION RETRIEVAL SYSTEM ACCORDING TO USER-SPECIFIED LOCATION INFORMATION

FIELD OF THE INVENTION

The present invention relates to information retrieval systems, and more particularly, to a method and system for creating and searching a database in an automated information retrieval system according to geographical location information provided by the user.

BACKGROUND OF THE INVENTION

In our modern, fast-paced society, consumers are increasingly relying upon directory assistance systems instead of conventional telephone books for quick access to directory information and guidance concerning local retail establishments or other popular destinations. Whether by use of landline or mobile telephones, directory assistance systems obviate the inconveniences of physically locating an appropriate telephone book and manually searching through the book to find a desired telephone number to call. Further, directory assistance systems are particularly useful for mobile telephone users who normally do not have access to a telephone book.

Conventional telephone directory assistance systems operated by local telephone companies have been in place in some format for over a century, before telephones even incorporated dialing mechanisms. In the modern versions of conventional telephone directory assistance, a computerized voice prompts a user to first identify a city and state and then provide a name of a person or a business. The requested telephone number is provided through a computerized voice. If necessary, a human telephone operator asks for additional information, such as spelling or a street address, and then performs a database search. While this service is quite useful, it is generally limited to either providing telephone numbers or directly connecting the caller to the requested person or business.

Recently, directory assistance systems, particularly those designed for use with mobile telephones, have incorporated additional features to facilitate searching for other types of information concerning retail business establishments. For example, directory assistance operators can provide information concerning the weather, movie listings, or restaurants of a particular cuisine located in the vicinity. These systems have proven to be quite popular. However, their operation requires direct interaction with a human operator, which is expensive.

As speech recognition technology continually improves, applications for utilizing speech recognition for information retrieval systems are becoming a more popular resource for consumers. As an example, "Info by Voice$^{SM}$ for Atlanta" is an automated, voice-operated telephone directory that is available to consumers in the metropolitan area surrounding Atlanta, Ga., who wish to obtain directory assistance information concerning topics such as restaurants, traffic information, stock quotes, weather, sports, and business news. By using this service, a caller provides information in response to a series of questions from a digitized voice, and then receives a list of names and contact information for businesses matching the desired criteria. For example, if a caller submits a request for Chinese restaurants, the system might identify five restaurants for the caller to consider. As can be readily seen, an audio information retrieval directory can provide a useful and convenient resource for local and topical information.

Developments in dynamic processing of an index in a database for information retrieval systems are described in U.S. Pat. No. 5,878,423 to Anderson et al., issued Mar. 2, 1999 ("the '423 patent"), which is incorporated herein by reference. The '423 patent discloses a method and system for dynamically processing an index to create a set of questions used when processing a data query. An index is a guide that is processed and used to find information from within a database, such as a database of classified advertising information. The set of questions are arranged according to a question set order associated with the index, and the set of questions only includes those questions that trigger responses that are found within the database.

While information retrieval systems such as those described in the '423 patent have become more efficient for processing data inquiries and retrieving database information, there are still difficulties that users encounter when using automated information retrieval systems. For example, although a caller may only be interested in obtaining directory assistance information pertaining to businesses in the caller's immediate vicinity, the system may unnecessarily identify businesses in locations that are scattered throughout a geographical region. As another example, the user may wish to search for items of interest near a certain location, but is unable to describe the location in a manner that is recognized by the system. These difficulties may require the user to either conduct multiple searches or to receive unnecessary search results, both of which detract from the benefits associated with the information retrieval system.

Accordingly, there is a need for a system and method for searching an information retrieval system according to user-specified location information for narrowing the scope of the database search.

SUMMARY OF THE INVENTION

The present invention is directed to a method and system for searching an information retrieval system for items of interest that are in proximity to geographical locations identified by the user. In a first embodiment, the information retrieval system performs a search for specified types of businesses or items of interest that surround or are in close proximity to the user's present geographical location. The system receives geographical location information concerning the user's position from the wireless network carrier, which tracks the location of the user's mobile communications device. In this embodiment, the user's identified location becomes the centroid for a radial search to find businesses in the same geographical area.

In a second embodiment, the user configures the information retrieval system to associate geographical locations that are known by the user with words or phrases by which the user typically describes or identifies those respective locations. The user in this configuration registers a geographical location where the user is currently located in the information retrieval system by speaking a word or phrase into the user's mobile or landline communications device. The system, identifying the user's current location and the user's personally identified reference name, creates a record for this information such that the location can be used as a centroid for a radial search. When conducting an information search at a later time, the user can then repeat the personalized word or phrase to narrow a search request to a geographical area in the vicinity of the registered geographical location.

An object of the invention is to provide a method for searching a database in an information retrieval system according to user-specified geographical location information. A database is created for storing geographical location information for each of a plurality of items of interest. Geographical location information corresponding to a location of a user's mobile communications device is received. The system receives a request to search the database for items of interest located in a vicinity of the user's location. A search query is then generated for items of interest in the vicinity of the location of the user's communication device.

It is yet another object of the invention to provide a method for performing a search on an information retrieval system to identify items of interest in a vicinity of a user-specified geographical location. A user is prompted to provide search criteria. A request by the user to search for items of interest in a vicinity of the user's present location is detected. Geographical location information from a user's communication network carrier is requested. A present geographical location of the user's communication device is provided, and a search query for items of interest in the vicinity of the present location of the user's communication device is presented.

A further object of the present invention is to provide an information retrieval system for identifying items of interest located within a vicinity of a user-specified geographical location. The information retrieval system includes a database records unit for storing a plurality of information about a plurality of items of interest, including a name of each item of interest and a corresponding geographical location. A geographic location processor receives a user-specified geographical location. A database index generates a search query including the user-specified geographical location.

Another object of the present invention is to provide a method for performing a search on an information retrieval system to identify items of interest in a vicinity of a user-specified location. A table of names of geographical locations specified by a user and geographical locations corresponding to the names is configured, wherein the user adds to the table while at different geographical locations. A request by the user to search for items of interest in a vicinity of a location stored in the pre-configured table is detected. A name of a geographical location stored in the pre-configured table as an audio speech signal is received. The pre-configured table is searched for a matching signal to extract the corresponding location information. A search query is generated for items of interest in the vicinity of the extracted geographical location.

Yet another object of the present invention is to provide a method for searching an information retrieval system for items of interest in a vicinity of a user-specified location. A request by a user to search for items of interest in a vicinity of a user-specified location is detected. The system determines whether the user requests to search according to the user's present location or a location stored in a pre-configured table of locations. If the user request is to search according to the present location, then location information is requested from a network carrier for the user's mobile communications device. If the user request is to search according to geographical location information in the pre-configured table of locations, then location information is requested from the pre-configured table of locations. The system then generates a search query using the provided geographical location information.

BRIEF DESCRIPTION OF THE FIGURES

FIG. 3 is an exemplary database table of information stored in an information retrieval system of the present invention.

FIG. 4 is an exemplary table representing a portion of the geographical location database according to a second preferred embodiment of the present invention.

DETAILED DESCRIPTION OF THE PREFERRED EMBODIMENTS

Figure 1:
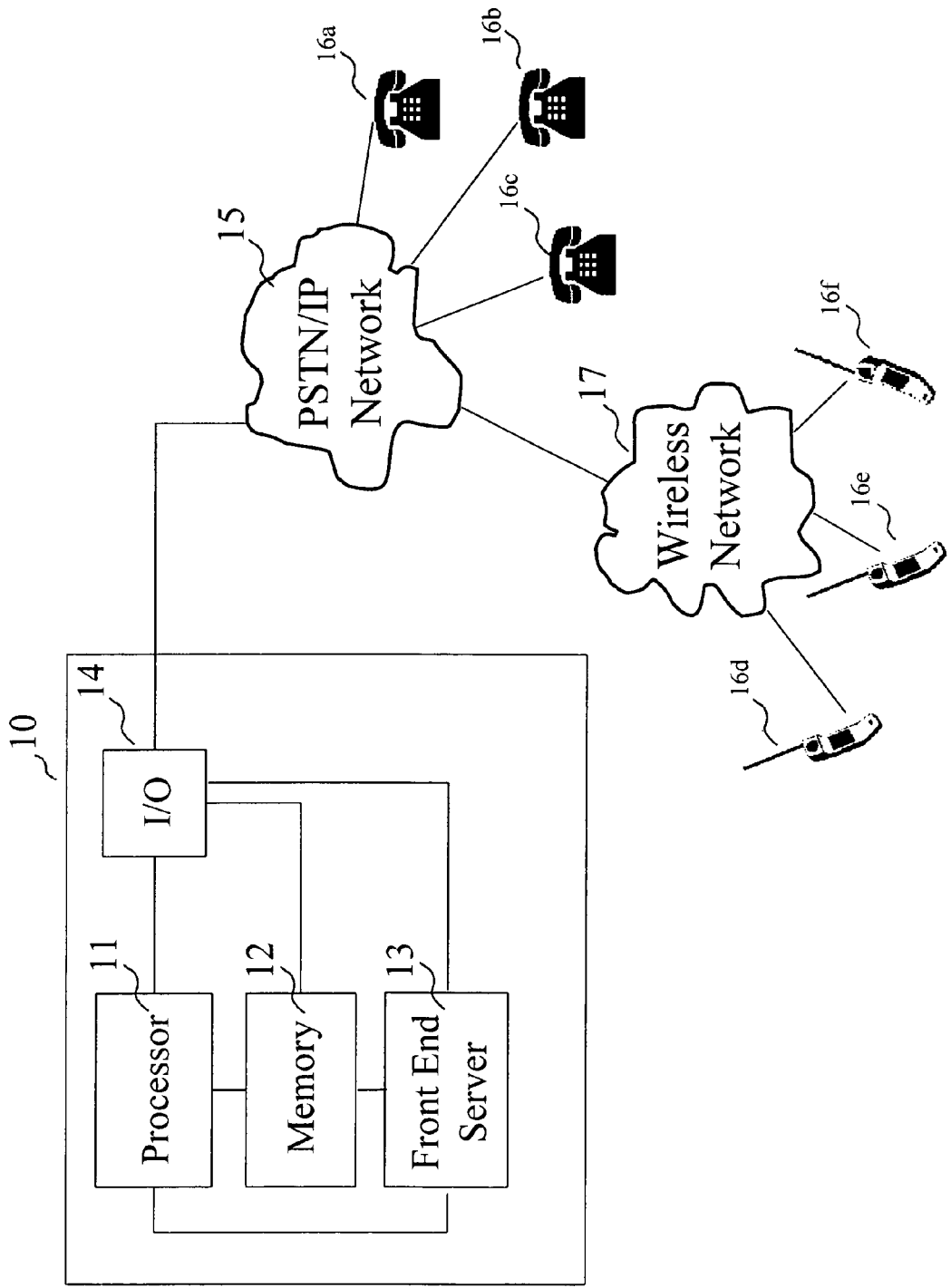
FIG. 1 is a schematic diagram of a computer system for use with an information retrieval system of the present invention.

The present invention is directed to a system and method for searching an information retrieval system according to personalized geographical location information as specified by the user. FIG. 1 is a schematic diagram of an exemplary computer system 10 for implementing the information retrieval system of the present invention. The computer system 10 includes processor 11, system memory 12, and telephony front end server 13. Information is input or output from the computer system 10 through I/O interface 14. The telephony front end server acts as a communications interface connected to a conventional public switched telephone network (PSTN) or IP telephone network 15 to provide a connection between the computer system at I/O interface 14 and a conventional landline telephone or wireless mobile telephone. Through this configuration, a user can interact with the computer system 10 through voice responses via conventional telephones 16a-16c. The telephone network 15 is connected to a wireless communications network 17, which in turn communicates with mobile telephones 16d-16f, or any other type of mobile communications device.

Figure 2:
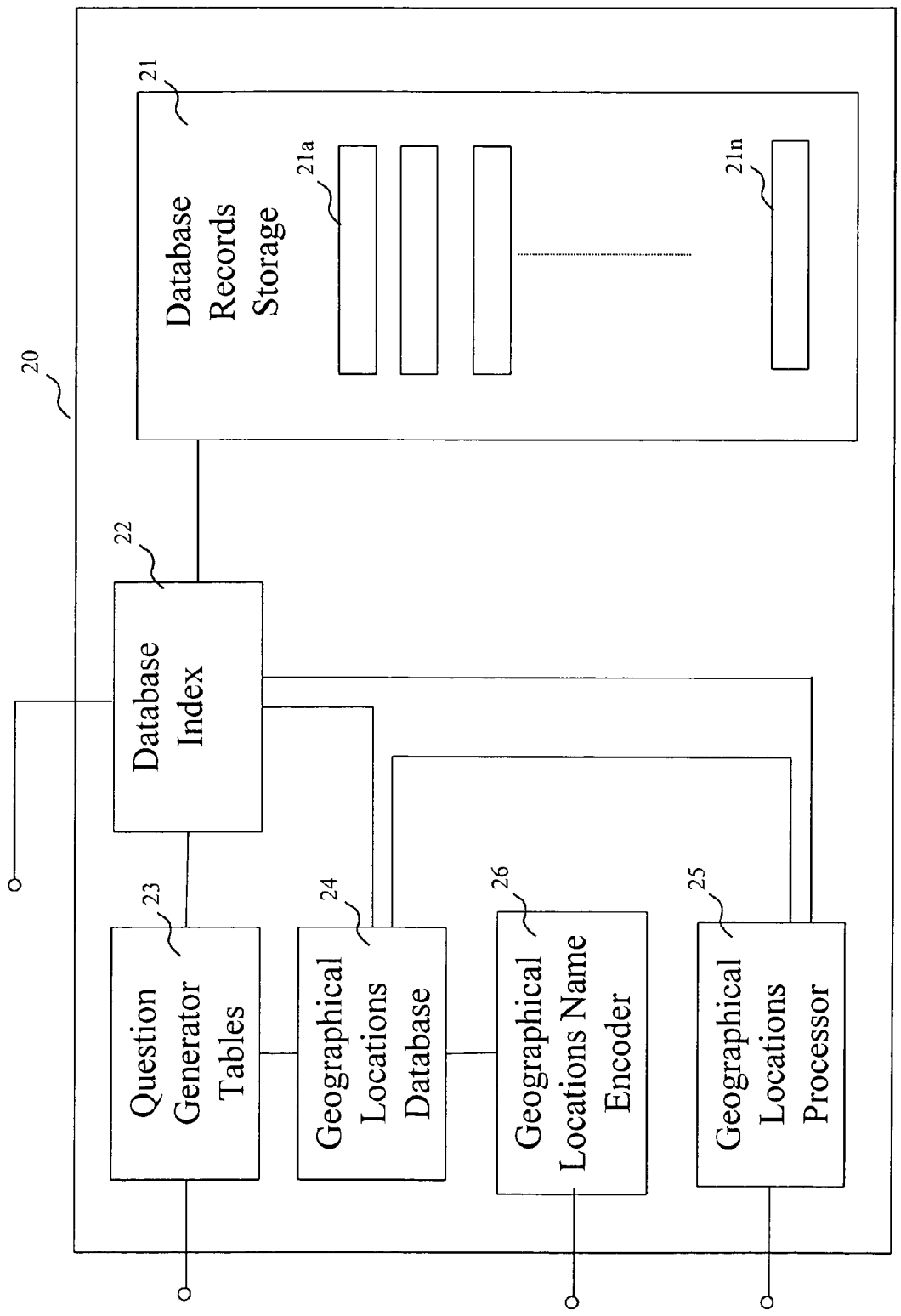
FIG. 2 is a schematic diagram of the database system stored in the memory of the computer system of FIG. 1.

FIG. 2 provides a schematic diagram of an exemplary database system 20 stored in system memory 12 of computer system 10. Database system 20 includes a database records storage unit 21, which contains a multitude of records 21a-21n of directory assistance information to be provided to consumers through the information retrieval system. The database records include information concerning businesses of a variety of types, including restaurants, stores, shops, and many other items of interest. The database records further contain criteria by which a user can distinguish between the different businesses, such as business name, hours of its operation, payment methods, any offered amenities, etc. Different criteria may be stored for differentiating between particular types of businesses.

An example of a series of database records for an exemplary item of interest is described further with reference to FIG. 3. As can be shown in the figure, some criteria are not applicable to all businesses. For example, the "prices" category is applicable to "Lee's Chinese Food Restaurant" and "Amocon Gasoline Station," but it is not applicable to "CVSO Pharmacy" or "Don's Meats Food Market."

In FIG. 3, each of the items of interest is associated with a geocoded coordinate pair that identifies the unique location of the business. As an option for added search capabilities many items of interest also may include one or more descriptive locations that indicate where the item of interest is located in context with a particular geographical region. For example, FIG. 3 illustrates that "Lee's Chinese Food" and "Baghdadi Cafe" are generally located "near downtown," and "Woodman's Department Store" is located "near Lincoln Mall."

Database records storage unit 21 is connected to a database index 22 for database processing, as shown in FIG. 2. U.S. Pat. No. 5,878,423 provides a discussion concerning the interaction of a database system with an index to facilitate database processing. Information provided to computer system 10 from a user is input to index 22 to facilitate searching in the database records storage unit 21, as is known in database processing.

The database index 22 is also in communication with question generator table 23. The question generator table supplies questions to prompt the user for data to supply to database index 22 to search the database records storage unit 21. Question generator table 23 dynamically generates a set of questions according to scripts, or collections of potential questions associated with index categories in database index 22. Questions are selected from the scripts according to input received as responses to previous questions. Questions are selected from the scripts that prompt a response recognizable in database index 22, which narrows the search results in the database records storage unit 21. Questions generated in table 23 are output from system memory as a string of data, which is converted in I/O interface 14 of computer system 10 in a speech synthesizer to provide a digitized, automated oral communication to the user to prompt a response. The generation of a series of questions for a database search is discussed in greater detail below with reference to FIGS. 9 and 10.

Question generator table 23 and database index 22 are both in communication with geographical location database 24. As will be explained in further detail below, geographical locations database 24 provides location information for narrowing the search in database index 22. Geographical locations database 24 communicates with geographical location processor 25, which calculates the geographical coordinates or formats other location information concerning a mobile communications device for customized searching according to a user-specified centroid.

Geographical location processor 25 processes a user's present location from information supplied by the carrier for the user's mobile communications device. Mobile communications devices operating on a wireless network transmit control signals to the controllers within the wireless network to communicate information other than speech signals, such as status and location. The geographical location for the wireless mobile communications device may be determined according to any of a variety of methods.

Through advances in E911 and cellular control signal triangulation technology, the location of a cellular communications device such as a mobile cellular telephone can be calculated with ever-increasing accuracy. In this method, a geographical location system determines the location of a wireless device by comparing the signal strength of the control signals emitted by a wireless device received at antennae at several neighboring cell towers. The signal strength is strongest at the nearest cell tower. A diminished signal is received at other cell towers in the vicinity. The differences in signal strength can be used to calculate the location of the wireless device.

Another method for determining the geographical location of a wireless device is to place location-monitoring equipment within the wireless device itself. Some wireless devices currently incorporate GPS receiver chips to receive location information by satellite. By connecting a GPS receiver in a wireless device to the communications equipment within a cellular telephone, the GPS geographical information can be forwarded by a wireless device over a control or talk channel to the wireless network.

A third method for determining the present geographical location of a mobile communications device is to forward the registration information temporarily stored within the wireless network. The wireless network maintains a database containing the status information for each wireless device in the network. If a wireless device is active, the database stores information pertaining to the nearest cell site at which the cellular device is likely to be located. By forwarding this information to the geographical location processor 25, the system can be provided with the location of the cellular device within an accuracy of a few square miles. The cell tower associated with each cell site has a "pseudo ANI," or "pseudo automatic number identifier," which provides a unique identification number for each cell tower.

The geographical location processor 25 of the present invention formats information supplied by the wireless network for the mobile communications device. Through control signals and via the front end server 13, the geographical locations processor 25 captures, or sends a request for, geographical location information from the wireless network of the respective mobile communications device. The wireless network first provides information regarding the type of location information tracked by the wireless network carrier. For example, the wireless network may utilize triangulation algorithms by which the network calculates geocoded graphical coordinates, or it may simply be able to identify the closest cell tower. The geographical location processor 25 then parses and formats the location data provided by the wireless network.

The location data in the geographical location processor 25 can be forwarded directly to database index 22 to be used as search criteria for a search request of database records storage 21. In this instance, database index 22 incorporates the location data as search criteria such that the database index 22 will only retrieve information concerning businesses or other places of interest that are located within a relatively close proximity to the provided location data. The location data is forwarded directly to database index 22 when a user conducts a search based upon his present or current physical location, which is described in further detail below as the first embodiment.

In other circumstances, the location data is provided to geographical locations database 24. Geographical locations database 24 stores and catalogs, for each user, a list of user-defined geographical location name descriptions and the corresponding geographical locations for search requests to be made at a later time. The geographical locations database is segmented according to user accounts. For each account, a user can identify and store, by name, a plurality of geographical locations. During later search requests, the user can provide a user identification to access a personalized database, and can then reference the name of a stored geographical location as search criteria for conducting an information request for businesses in close proximity to the desired geographical location.

The names by which a user identifies geographical locations can be common or officially known names (e.g., the "George Washington Elementary School") or names that are personally or uniquely known to the user (e.g., "Johnny's school"). The user stores the name into the database by speaking into the mobile communications device and transmitting the spoken audio signal to the information retrieval system when prompted to do so. The system digitally records and encodes the signal in the geographic locations name encoder 26. In the preferred embodiment, the encoder 26 parses the spoken audio signal according to phonemes through speech recognition algorithms. A digitally encoded representation of the spoken name for the geographical location is then stored in the geographical location database 24 for later reference.

In the second embodiment, geographical location information is forwarded from the geographical location processor and stored with a corresponding name stored in the geographical location database. An exemplary table representing a portion of a geographical location database is provided in FIG. 4. The data that represents the geographical location stored in the database may be a geocoded graphical coordinate pair representing a unique location. Alternatively, the geographical location data may be represented by a code indicating a region, such as an area encompassing a zip code, township, community, city, or county. The location data could also indicate a cell in a cellular network system. The geographical location information stored in the database could include a combination of data, such as a coordinate pair and a cell site. The type of location data that is stored in the database depends upon the type of information provided by the wireless network for the mobile communications devices, and the related criteria required by the search engine for the information retrieval system.

Although the information retrieval system of the preferred embodiments includes a geographical locations database and geographic location processor within the memory of the information retrieval system itself in FIG. 2, the present invention is not limited to this configuration. For example, the information retrieval system can also be configured such that the geographical locations database and geographic location processor are located within the mobile communications devices. In such case, the question generator table 23 and database index 22 receive information from the locations processor and database via a control or talk channel during a communication over the wireless network during a search operation.

Figure 5:
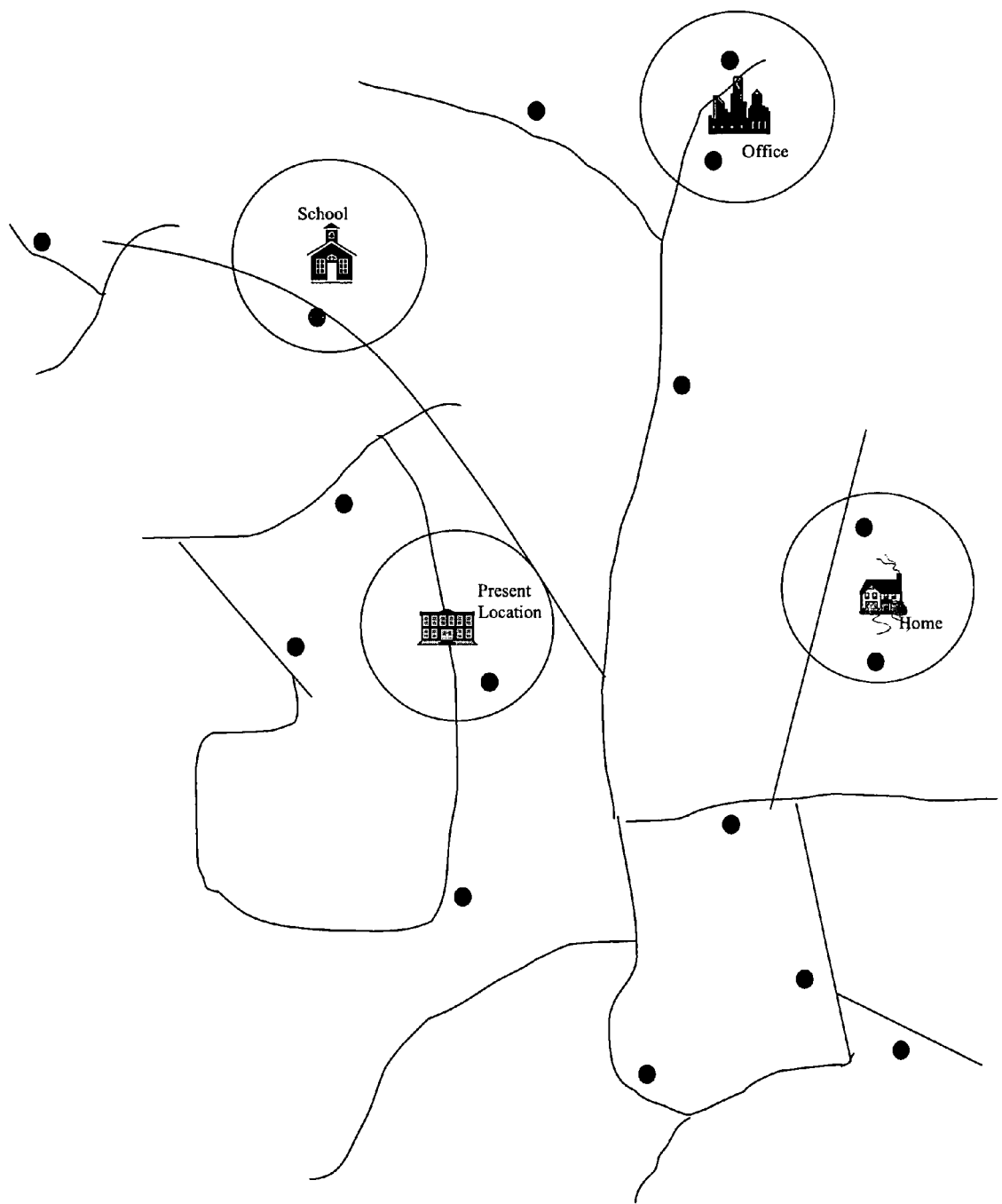
FIG. 5 is an exemplary map providing illustrating the location of a plurality of items of interest in proximity to a user's present location and pre-configured search locations according to the present invention.

An information retrieval system can be configured to perform searches according to the first embodiment or the second embodiment, or a combination of the two. FIG. 5 is a geographical representation of the options by which a user can search, where the user pre-configured the system to perform searches around a school, office, home, or present location. Circles represent the items of interest that are searched for.

Figure 6:
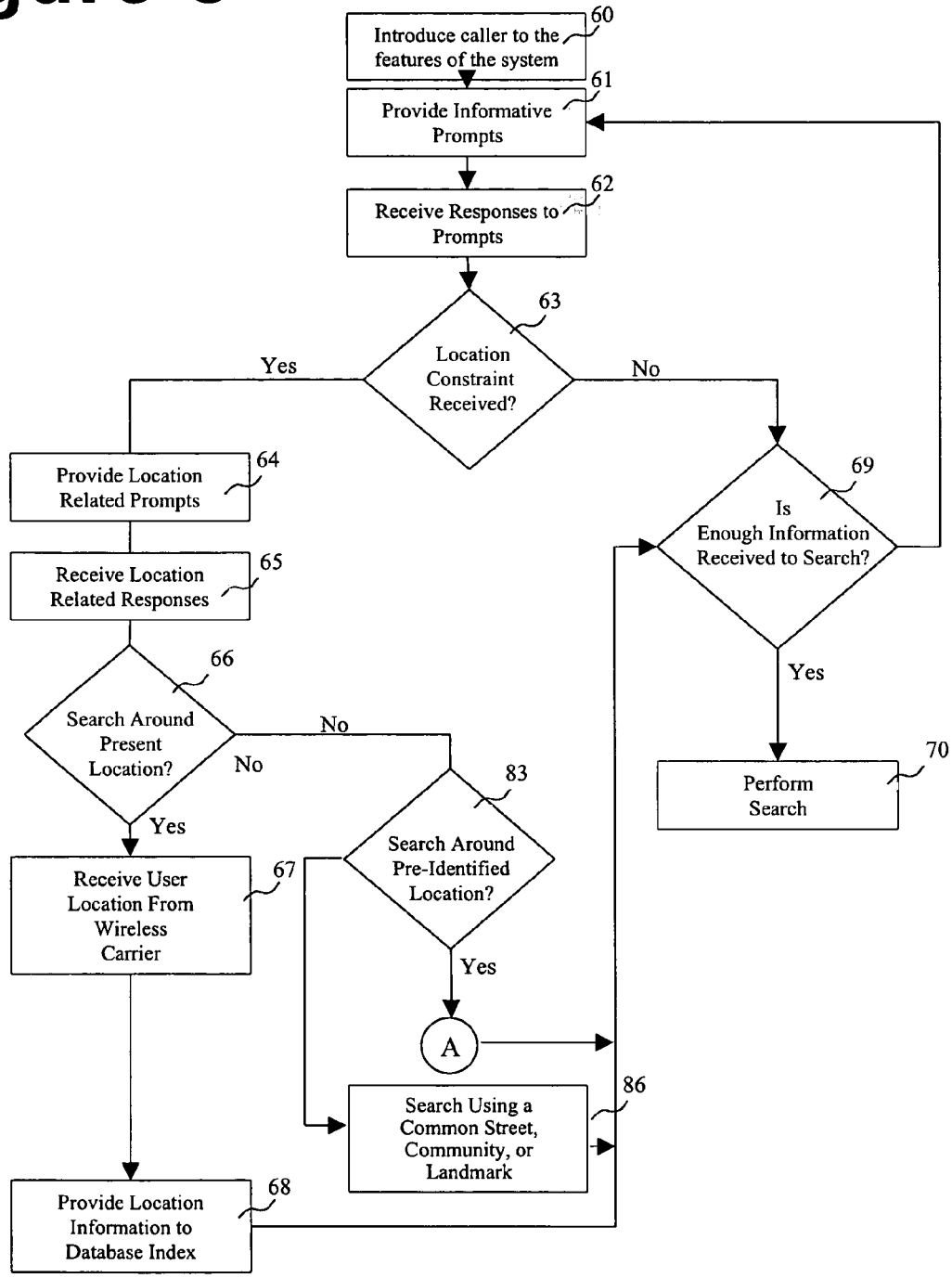
FIG. 6 is a flow diagram of the method according to a first preferred embodiment of the present invention for searching the information retrieval system according to the user's present location.

A description of the method of performing a search in an information retrieval system according to the first embodiment of the present invention is described with reference to the flow diagram of FIG. 6. Upon initiating a call to the information retrieval system, the caller is first introduced to features of the system in step 60. The system may provide a menu of features for the user, perhaps through speech synthesis over a cellular mobile telephone, or through text on an interactive pager or personal digital assistant. The dialogue in steps 61 and 62 is directed by a dynamic grammar algorithm, in which a set of questions is selected from pre-generated scripts in the question generator table 23. The selected questions are chosen dynamically, in that they are responsive to the input received from the user. For example, if the user indicates that she is searching for a restaurant, the system will most likely inquire about the user's desired type of food. On the other hand, if the user indicates that she is searching for a drugstore/pharmacy to fill a prescription, the system may inquire about the brand name of the chain or what health plan the user carries. As a follow-up question, the system may ask about the desired location. Therefore, the system selects different questions depending upon the user's response to simulate a human conversational interview.

In the information retrieval system according to the first embodiment, the system determines in step 63 whether the user requests to perform an information retrieval search within a vicinity of a specified geographical location. If the user indicates an intention to search according to location, the system prompts the user in step 64 to provide a description of the location to be searched. The prompt is generated in the question generator table 23. The system then waits for an expected response in step 65.

In the search method of the first embodiment, a detector in step 66 receives an indication that the user desires to search the area surrounding the user's present location. The user may indicate this by speaking one of several possible audible phrases into a mobile communications device, which is then transmitted, decoded and recognized by the information retrieval system. For example, the system may detect and recognize phrases such as "present location," "surrounding area," "around here," "where I am now," etc. As an alternative, the user might respond to an informative prompt, such as "to search around your present location, press 1 or say 'one', to search around another location, press 2 or say 'two' . . . "

In response to the user's request to search according to the user's present location, the information retrieval system next determines the user's location. The system either processes an already received location or requests the user's location from the wireless network carrier over a control or talk channel in step 67. The carrier first provides information regarding the format of the location information to be provided. The system then receives data representing location information, which is processed and formatted in the geographic location processor 25. The formatted location information is forwarded to database index 22 in step 68 for querying the database records storage 21.

The system evaluates whether sufficient information has been received and interpreted to perform a search request that would yield a reasonable number of search results. If, in step 69, it is determined that more information is needed, the system returns to step 61 to provide additional informative prompts and receive additional searching criteria. At this point, the system will directly continue from step 63 to step 69, because the user already provided location information. If adequate information can be provided for the search query based upon the user's responses to the informative prompts, the search engine performs the search in the database storage records in step 70.

A description of the method of pre-configuring an information retrieval system for searching according to the second embodiment of the present invention is described with reference to the flow diagram of FIG. 7. While travelling in a car, walking, or otherwise being in transit, a user may realize that he may wish at a later time to refer to the present location in an information retrieval service. To initiate the pre-configuration routine, the user will initiate a session with the service and speak a certain command or depress a certain button or code on the mobile communications device. Upon receiving an indicator from the user in step 71, the system prompts the user to enter a name that describes the location in step 72 (e.g., "John's School"). Once the system receives the location name in step 73, the system converts the signal to digital input and parses the input in step 74 according to a preferred speech recognition algorithm (e.g., phoneme-based parsing for analysis through Markov modeling). The system retrieves from the user's network carrier the geo location of the user in step 75. The system then checks in step 76 whether the location name was previously stored in the system. If the name does not exist, the location information and the required name is then stored in the geographic locations database in a record associated with the user's account in the information retrieval system in step 80.

Figure 7:
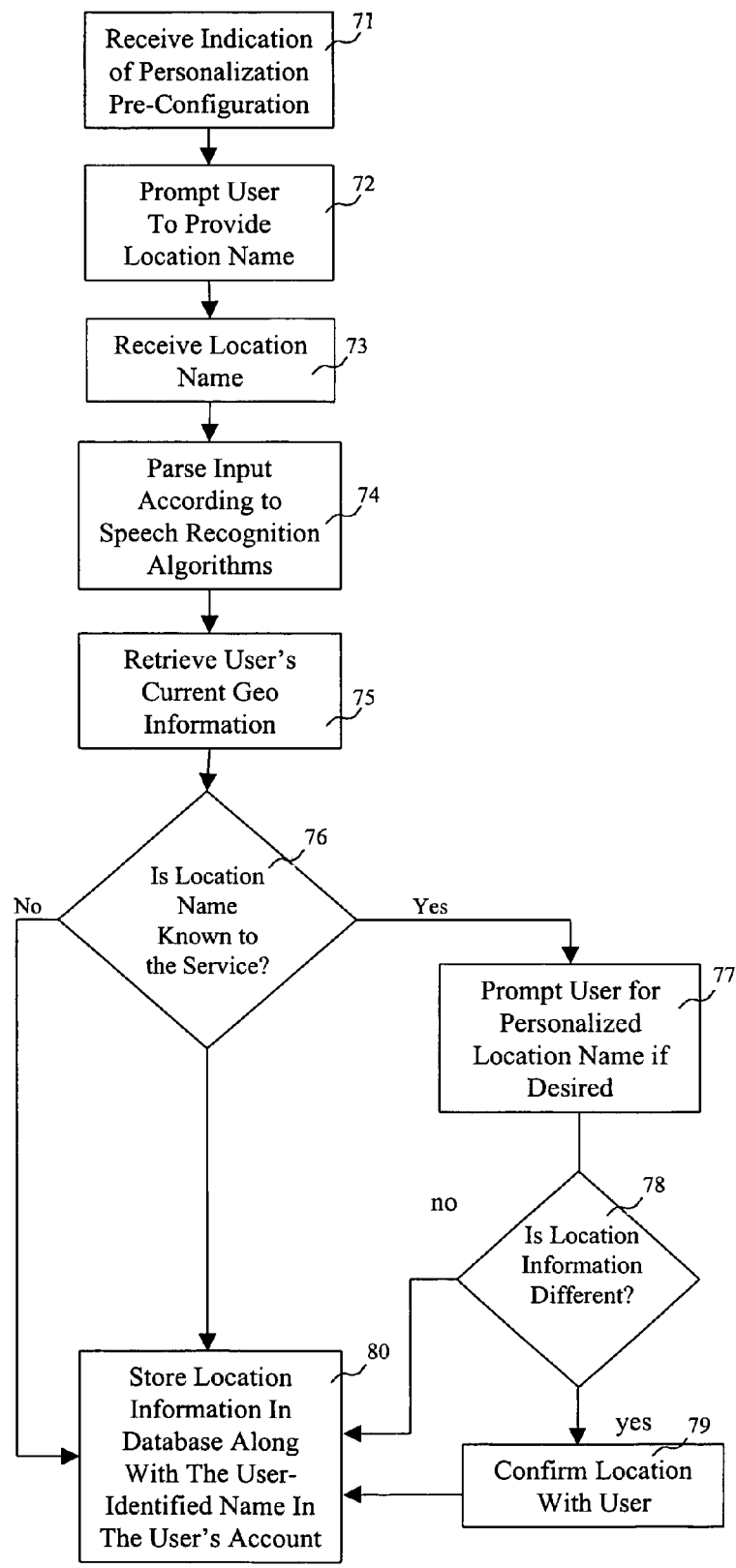
FIG. 7 is a flow diagram of the method for pre-configuring the geographic locations database according to the second preferred embodiment of the present invention.

Further related to FIG. 7 is the method of pre-configuring of a business location as a reference for a personalized landmark. In this embodiment, the caller does not have to be at the location but invokes the enrollment process in step 71. The user is prompted to provide a location name in step 72. The service will ask the caller to qualify the type of business as a means to identify the desired business. Based on the user's reply, the service prompts for the type location, e.g. a business or public location. The user replies with a location in step 73. The system processes the reply into an equivalent phonetic string in step 74. The system then retrieves from the user's network carrier in step 75, the geo location of the user. The system next in step 76 compares the location provided by the user with known data. If the location is found in the service, the system prompts the user for a personalized name in step 77. Next, in step 78, the system compares the geo location received from the wireless carrier to that of the previously known geo location associated with the location name received in step 73. If the location information is different, the system confirms the user is at the specified location in step 79. If at the location, the geo data from the wireless carrier is noted. Lastly, the system updates the user's account with the personalized name and, if appropriate, the new Geo data in step 80.

As an example of how to pre-configure a personalized landmark business location, a user may wish to conduct searches around a fitness club that is officially named "Norcross Sport, Health & Racquet Fitness Center," although the user commonly refers to the fitness club as "the club." After indicating that the user wishes to pre-configure the search system, the user will then speak the official name of the health club and the location of the health club. The system will detect that the user is not at the health club, and will ask for confirmation that the user wishes to program the health club's location into the search system. The system is now configured to perform searches based upon this pre-configured, personalized location information.

The method for dynamically configuring the information retrieval system is not limited to any particular order. The system may alternatively request location information before receiving and encoding the location name, or the system may perform these operations simultaneously. Further, it is possible that the pre-configuration process might occur within the named service flow after the user locates a specific business. For example, after locating a certain fitness club during the normal usage of Info by Voice$^{SM}$, the service will ask if the user would like to use this business as a personalized landmark. The user may then indicate a personalized name, such as "my club," by which the location can be identified.

Figure 8:
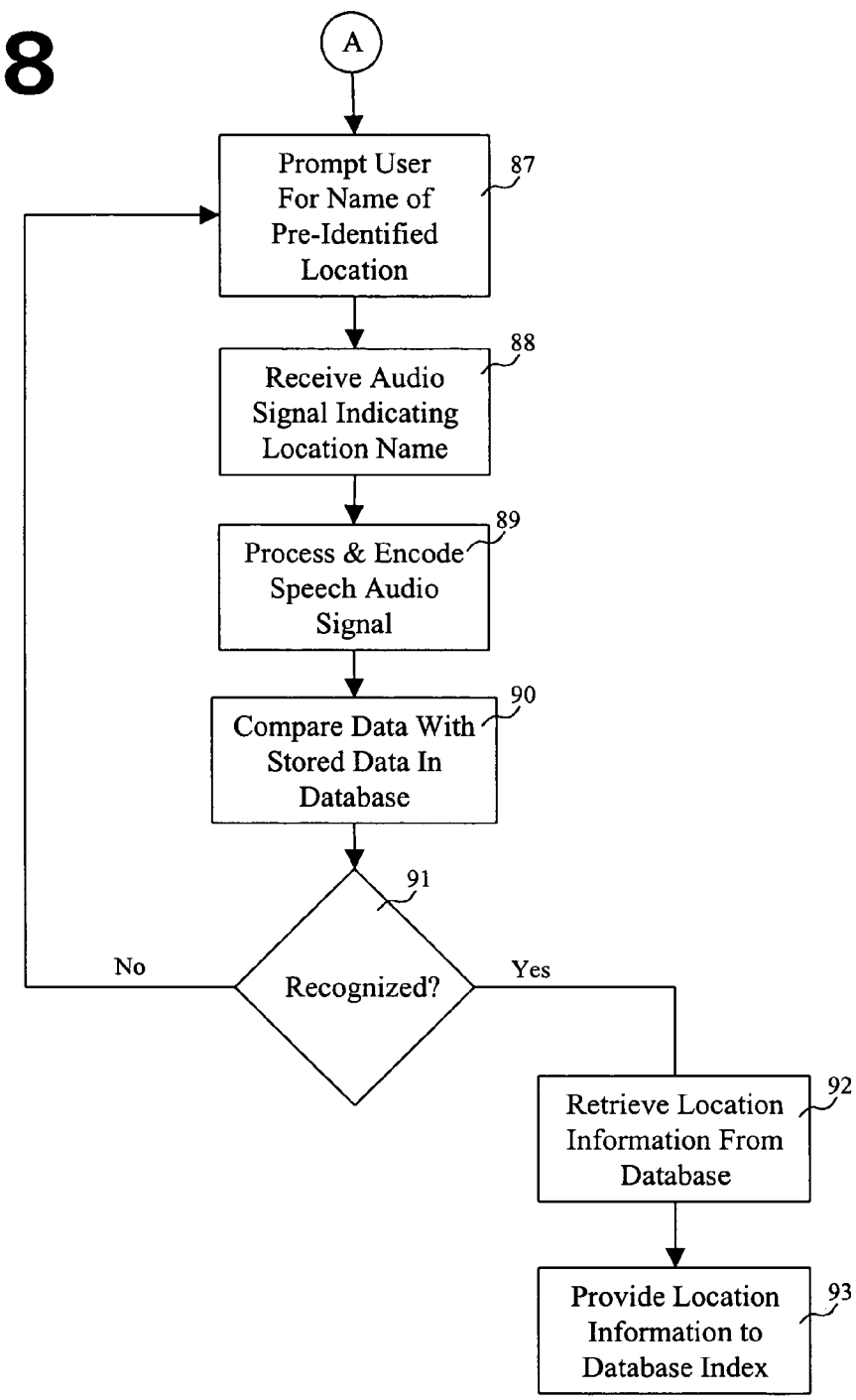
FIG. 8 is a flow diagram of the method according to the second preferred embodiment of the present invention for searching the information retrieval system according to information in the geographic location database.

The method for incorporating personalized, dynamically identified location information according to the second embodiment is described with reference to FIGS. 6 and 8. As can be seen in FIG. 6, this method is performed when the information retrieval system determines in step 66 that the user does not wish to search around the user's present location. In step 85, the system determines whether the user wishes to search around a pre-identified location. If not, the system prompts the user in step 86 for a common street name, community, or landmark name about which the system will conduct a search.

If the system determines in step 85 that the user wishes to search around a pre-identified location, the information retrieval system prompts the user for the name of the pre-identified location, in step 87. In the preferred embodiment, the user speaks this name through the handset of the mobile communications device. Upon receiving an audio signal indicating a location name in step 88, the system digitizes and processes the speech signal in step 89. The processed speech signal information is then compared with the geographical names data stored in the geographical locations database that correspond with the user in step 90. If the name provided by the user is not recognized in step 91, the system re-prompts the user for the name of a pre-identified location in step 87. In an alternative embodiment, the system prompts the user to spell the unrecognized location name.

Once the system finds a match between the name input by the speaker and a pre-configured, pre-stored name, the system in step 92 retrieves the location information from the geographical locations database. Corresponding geographical location information is then provided to the database index in step 93 to add search criteria for searching the database. This geographical location information may be information such as a unique geocoded geographical coordinates, a zip code, cell tower number, cell tower location, regional location, township information, etc.

Figure 9:
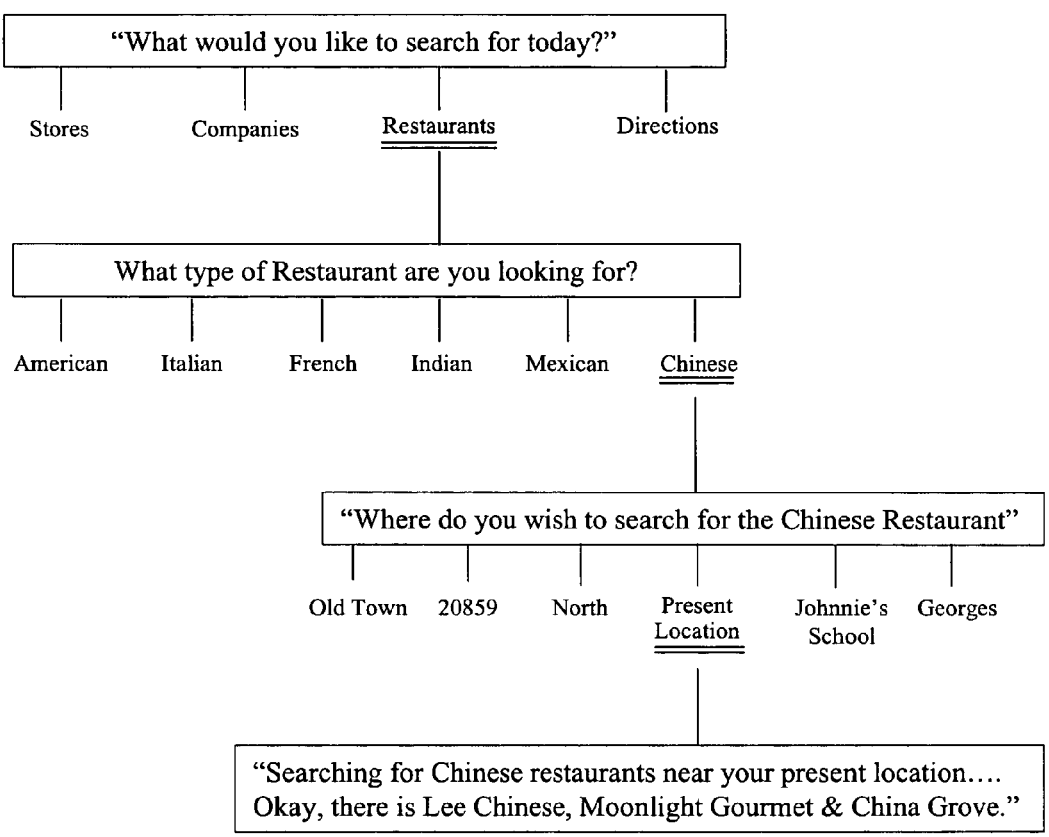
FIG. 9 is an example of a dialogue for searching based upon present location, according to the first preferred embodiment of the present invention.

An example of an operation of the information retrieval system to perform a search according to the first embodiment will now be described with reference to FIG. 9. In this example, the user is looking for a selection of restaurants specializing in Chinese food that are in close proximity to the user's present location. The system, through the question generator table 23, first asks the user, "What would you like to search for today?" The system is pre-configured to "recognize" a number of different answers. In this example, the user states, "Restaurants." Again, the system may recognize dozens of possible responses. As the user responds with the word, "Chinese," the database index enters "Chinese Restaurant" as part of the search criteria. The question generator table may next ask, "Where do you wish to search for the Chinese Restaurant?" The system will recognize any number of possible responses, including a number of different responses that designates the user's present surroundings. When the user responds with, "present location," the system applies or requests geographical location information from the wireless network carrier. Geographical location information is then forwarded to the database index, which then performs a database search for Chinese restaurants located in the vicinity of the user.

In determining the radial distance to be searched, the system may consider various factors such as the time of day, the number or density of businesses surrounding the location, etc. For example, if a user is looking for a particular store late at night, it might be worthwhile to provide a larger radial search, because there are fewer stores that are open at a late hour. The system may additionally factor the day of the week in conjunction with the time of day, because the hours of operation for restaurants and other businesses depend upon the day of week. Likewise, if the user requests a search while located in a rural area, where few businesses are located, the system may provide a larger radial search to generate sufficient search results to offer adequate choices for the user. In contrast, if the user is searching in a dense business region, a smaller radial search may be applied to constrain the result set. In determining whether to expand the search, the system may store business density information according to the zip code, city, or community.

Figure 10:
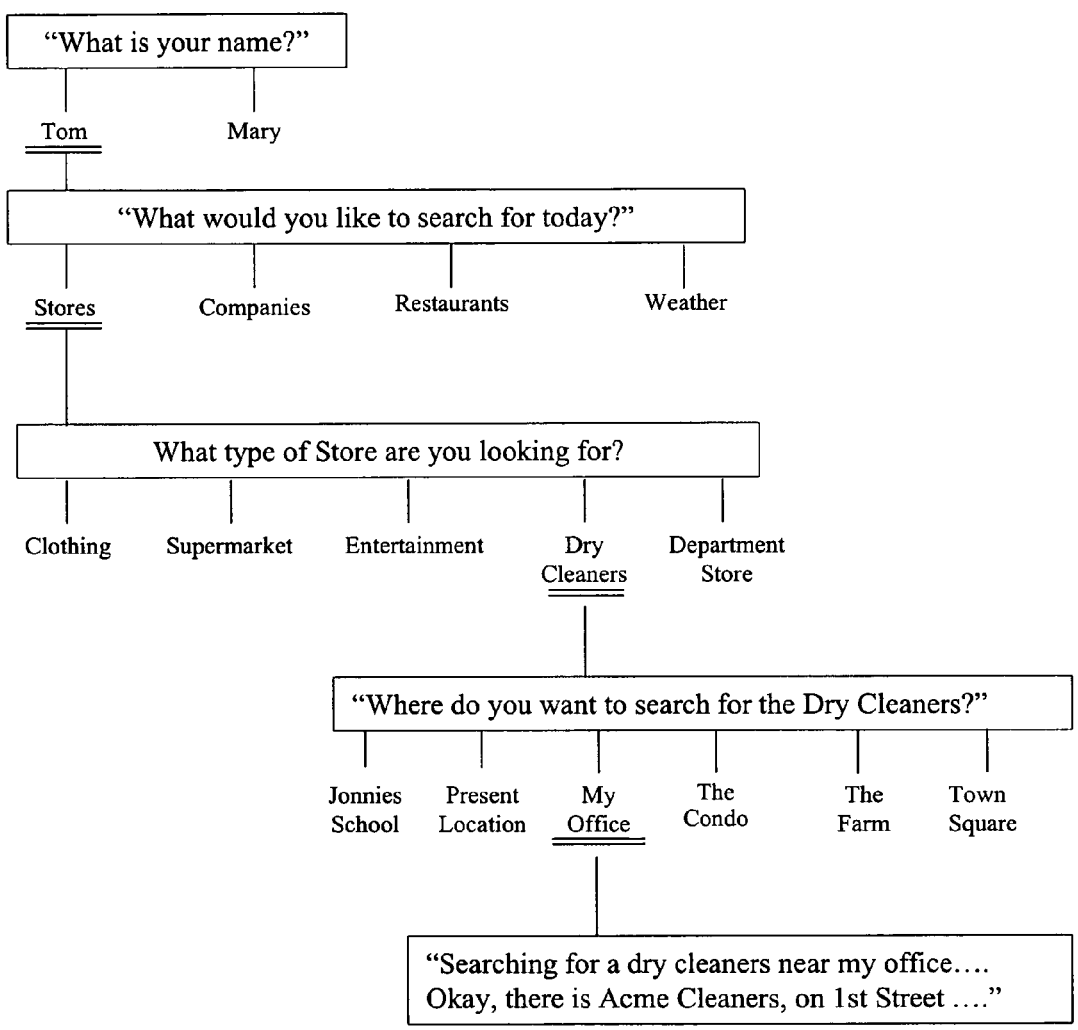
FIG. 10 is an example of a dialogue for searching based upon information in the geographic location database, according to the second preferred embodiment of the present invention.

An example of an operation of the information retrieval system to perform a search according to the second embodiment will now be described with reference to FIG. 10. In this example, the user is travelling to the user's workplace and is looking for a dry cleaner near the office. As in the example of FIG. 9, the system first introduces the user to the features of the information retrieval system and conducts a dialogue with the user. As part of this dialogue, the system asks the user for identification information, in case there is more than one user who operates the mobile communications device (e.g., a shared cellular telephone). In response to the question of "Where do you wish to search for a dry cleaner?", the user responds by stating, "my office." The system recognizes this phrase and extracts the geographical location information that was pre-configured in the user's account. A search is then performed and a dry cleaner is located near the user's office.

The method of populating the geographical location database 25 for searching the information retrieval system according to the second embodiment has been described by identifying locations through the user's mobile communications device. In an alternative embodiment, the user can pre-configure the geographical locations database 25 through a home computer. In this method, the user can access the information retrieval system directly via a modem, or through an Internet connection. The user can type geographical names using the keyboard, or speak the names representing personalized geographic locations into a microphone, in the same manner as if the user were utilizing a mobile communications device. The user can then indicate the actual geographical location by "pointing-and-clicking" using commercially available mapping software (e.g., MapQuest™), which would be made available on the user interface (e.g., website) for the information retrieval interface. Alternatively, the user can also type in an address, street number, or known business name, and have the system identify the actual geographical location.

The methods in the preferred embodiments that have been described thus far are for searching an information retrieval system via a mobile communications device. In an alternative embodiment, the information retrieval system can also be searched via a landline telephone. For the first embodiment, the system receives the user's present location information from the Public Switched Telephone Network (PSTN). For the second embodiment, the method is performed in the same manner as with a mobile communications device.

The foregoing disclosure of embodiments of the present invention and specific examples illustrating the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. A method for searching a database in an information retrieval system according to user-identified geographical location information using a mobile communications device operating on a wireless network, comprising:
    creating a database for storing at least geographical location information for each of a plurality of items of interest, wherein creating the database comprises:
        prompting a user of the mobile communications device to provide a location name for a desired geographical location remote from the present geographic location of the mobile communications device;
        receiving geographical location information corresponding to the present geographical location of a user's communications device;
        comparing the present location with the desired location;
        if the desired location is different from the present location, confirming the desired location with the user of the wireless communications device; and
        storing in a database the desired location and the provided location name, for subsequent access by the user;
    receiving a search request from the user;
    detecting whether the request is to search the database for items of interest located in a vicinity of the present geographical location of the user's communications device or of a different geographical location identified by the user and being a previous geographical location of the user's mobile communications device, wherein information regarding the previous geographical location is pre-configured by the user at a prior time;
    if the request is for items of interest located in the vicinity of present geographical location, generating a search query for items of interest only within a certain geographical proximity of the present location; and
    if the request is for items of interest in a vicinity of the previous geographical location,
    generating a search query for items of interest only within a certain geographical proximity of the previous geographical location identified by the user.

2. The method of searching a database according to claim 1 wherein the geographical location information of the user's mobile communications device is determined by triangulation of control signal strength received at cell towers surrounding the user's communication device.

3. The method for searching a database according to claim 1, wherein the geographical location information of the user's mobile communications device is determined by a GPS receiver within the user's communication device.

4. The method for searching a database according to claim 1, wherein generating a search query comprises calculating a radial distance surrounding the specified geographical locations and searching for items of interest at geographical locations within the calculated radial distance.

5. The method for searching a database according to claim 1, wherein the different geographical location specified by the user is a location known to the system and is then personalized by the user for a future search as a personalized landmark for a radial search.

6. The method as in claim 1, wherein creating the database comprises orally creating the location name using the mobile communications device and associating the specified name with the desired geographical location while the user is in the previous geographical location.

7. The method for searching a database according to claim 6, wherein orally creating the specified name further comprises:

receiving a name specified by the user for the previous geographical location;

storing the specified name and corresponding geographical location information as an entry in a locations table; and upon receiving a request to search for items of interest in the vicinity of a geographical location specified by name, (i) searching the locations table for the specified name, and (ii) providing the geographical location information corresponding to the specified name in a search query.

8. The method for searching a database according to claim 7, further comprising digitally encoding an audio speech signal of the specified name, wherein the digitally encoded signal identifies a specific location and is stored in the locations table.

9. The method for searching a database according to claim 7, wherein the user pre-configures the locations table with geographical locations at which the user intends to search.

10. The method for searching a database according to claim 7, further comprising:

requesting a user identification before storing a specified name and corresponding location information in the locations table; and requesting a user identification before searching the locations table, wherein the specified names and corresponding locations are stored according to the user identification.

11. The method as in claim 1, wherein the geographical proximity is a radial distance relative to the geographical location identified by the user.

* * * * *